United States Patent [19]

Dalury

[11] Patent Number: 5,692,265
[45] Date of Patent: Dec. 2, 1997

[54] ERGONOMETRIC HANDLE

[76] Inventor: David F. Dalury, 8322 Bellona Ave., Baltimore, Md. 21212

[21] Appl. No.: 331,288

[22] Filed: Oct. 28, 1994

[51] Int. Cl.⁶ .................................................. B29C 33/40
[52] U.S. Cl. ................ 16/111 R; 16/110 R; 16/DIG. 12; 74/551.9; 273/75; 273/81.4
[58] Field of Search ............................. 16/110 R, 111 R, 16/116 R, 116 A, DIG. 12; 273/75, 81.4, 144 R; 74/551.1, 551.9

[56] References Cited

U.S. PATENT DOCUMENTS

| | | | |
|---|---|---|---|
| 2,951,482 | 9/1960 | Sullivan | 16/111 R |
| 3,868,710 | 2/1975 | Jones | 16/DIG. 12 |
| 4,038,719 | 8/1977 | Bennett . | |
| 4,147,348 | 4/1979 | Lee | 16/DIG. 12 |
| 4,183,528 | 1/1980 | An . | |
| 4,488,460 | 12/1984 | Ballone . | |
| 4,890,355 | 1/1990 | Schulten | 16/110 R |
| 4,934,024 | 6/1990 | Sexton, I | 16/111 R |
| 5,060,343 | 10/1991 | Nisenbaum . | |
| 5,125,130 | 6/1992 | Stanish . | |
| 5,251,380 | 10/1993 | Craig | 16/110 R |

*Primary Examiner*—W. Donald Bray
*Attorney, Agent, or Firm*—Max Stul Oppenheimer

[57] ABSTRACT

An ergonometric handle is shaped so as to encourage a natural working grip, thereby increasing user comfort and enabling a user to use a tool incorporating said handle for a longer period of time with reduced fatigue to the tissues, nerves, tendons and bones of the hand. The handle may be angularly disposed relative to the long axis of the tool and the ends of the handle are smaller in width than the middle in order to accommodate the smaller gripping circumferences of the index and small digits. Thus the cross sectional shape of the handle is oblong and when viewed from the side is humpbacked. The grip honors the varying ratios of the digits to the metacarpals. The handle also has indentations in it to enhance the placement of the digits in the natural gripping position. These indentations form a hand imprint in the handle.

16 Claims, 6 Drawing Sheets

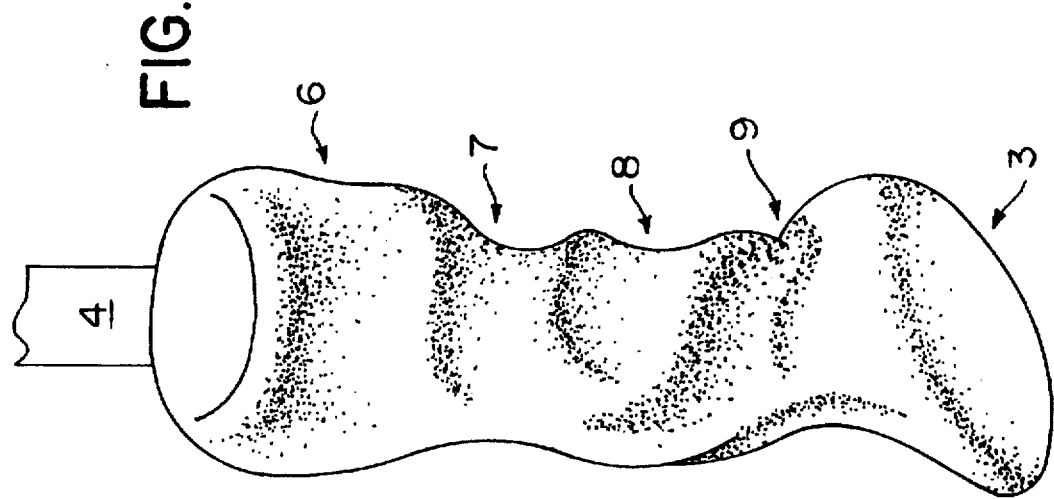
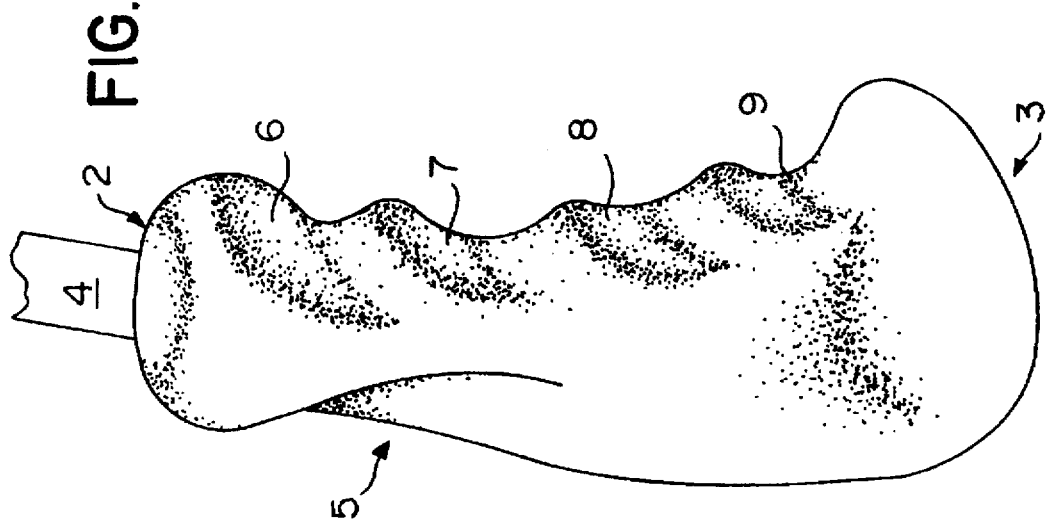

ERGONOMETRIC HANDLE

FIELD AND BACKGROUND OF THE INVENTION

The present invention relates in general to handles for tools and in particular to a new and useful tool handle which provides a contour which takes advantage of a natural grip, thereby increasing user comfort and control. The term "tools" is used in a broad sense to encompass all implements used to augment human activity and would include, for example, sports equipment and garden implements as well as hand tools such as hammers.

At rest the hand tends to fall into a natural position that is referred to as the anatomic position. Roughly this position corresponds to a neutral position of the wrist relative to the forearm when viewed from the side and with the metacarpal of the small digit parallel to the ulna bone of the forearm. The natural creases of the palm are angled and are not perpendicular to the forearm. This gives a natural arcade to the digits.

When using a tool, user comfort increases as the hand position approaches the anatomic position. The anatomic position transmits the least amount of stress from a hand held tool to the underlying bone, joint, tendons, nerves and vessels.

The grip of the hand is formed by the pressure of the partially flexed digits (fingers) against the palm with counterpressure applied by the thumb lying more or less in the plane of the palm. The palm has a natural concavity based in its center. If a person lays a pencil across his or her palm, the pencil does not touch the center of the palm.

In a grip position, the digits are flexed, laterally rotated and inclined towards the ulnar side of the hand. The degree of flexion of the digits and the area of the palm involved vary according to the size and shape of the object held. The following chart summarizes the average angles (in degrees) of the different joints of the different digits:

|     | IF  | LF | RF | SF |
|-----|-----|----|----|----|
| MCP | 105 | 95 | 90 | 85 |
| PIP | 85  | 90 | 90 | 85 |
| DIP | 95  | 90 | 90 | 90 |

IF = Index Digit
LF = Long Digit
RF = Ring Digit
SF = Small Digit
MCP = Metacarpal Phalangeal Joint
PIP = Proximal Interphalangeal Joint
DIP = Distal Interphalangeal Joint It is also an anatomical fact that there are different ratios of the metacarpals (bones in the palm) in relation to the length of the digits of the hand. There is a different amount of force and strength associated with each digit. For example, the average ratio of the long digit to the long metacarpal for a male is approximately 0.70 whereas for the small digit it is 0.55. Therefore, the most natural gripping position will have different positions and contributions from each digit.

A major percentage of grip strength comes from the small digit and the ring digit. It is easier to remove a pencil gripped by a person's index digit and long digit as opposed to one gripped by a person's small digit and ring digit. The most comfortable and natural grip must honor these anatomical facts or a hand will suffer increased stress and fatigue with repetitive manual activities. A more natural grip will reduce the risk of repetitive stress injury such as carpal tunnel syndrome.

Comfort and stress are related to the surface presented to the hand as an interface for transferring forces between the hand and the tool. Each type of cross-section offers different performance characteristics. A tool handle with a circular cross-section allows a uniform rotation of the gripping hand to adjust to a comfortable gripping posture for varying tool orientations. An ovate cross-section is a close approximation of the shape of the closed hand. A polygonal cross-section offers both flat planes and facets. Cushion grips of varying textures and shapes may also be used.

The use of conforming planar surfaces on a tool handle grip, may provide a larger area of interface. Accompanying facets, or edges, of such planes can also provide resistance to twisting and slipping forces, as well as additional sensory feedback for control decisions, but they also increase friction effects and can reduce specific areas of needed interface.

It should also be noted that the metacarpal phalangeal joints are distal to the main palmer crease. Gripping a conventional handle causes the skin of the palm to fold on itself, creating the potential to pinch the skin between the handle and the underlying bone.

For an example of a non-cylindrical handle, see U.S. Pat. No. 4,488,460 ("Ergonomic Handle for Hand Tool") issued Dec. 18, 1984 to Ballone which discloses an ergonomic handle improving upon a cylindrical handle. It has a substantially elliptical cross-section taken in a first plane which forms a dihedral angle of approximately thirty (30) degrees with respect to a second plane which is normal to the longitudinal axis of the shank of the tool. The length of the minor axis of the elliptical cross-section is approximately sixty percent (60%) of the length of the major axis. The handle is formed substantially as a revolution of the elliptical cross-section about its major axis.

U.S. Pat. No. 5,060,343 ("Tool Handle"), issued Oct. 29, 1991 to Nisenbaum discloses a tool handle which has a pair of perpendicularly extending hand grips secured at spaced locations along the handle. The tool handle includes a plurality of intersecting inclined portions. In one embodiment, the tool handle has a distal end dimensioned for engagement with a hollow cylindrical socket on a tool head shank.

U.S. Pat. No. 5,125,130 ("Ergonomic Handle for Tools and Sporting Equipment") issued Jun. 30, 1992 to Stanish discloses a handle which comprises an elongated member equipped with a two-membered gripping portion at one end whose two members are disposed at compound angles from the longitudinal axis of the elongated member, corresponding to the natural angles of hand, wrist, and forearm in a pointing posture.

The invention described and claimed herein comprises an ergonometric handle which addresses the anatomic peculiarities of the human hand and its natural gripping function and position. It is shaped so as to encourage a natural working grip, thereby increasing user comfort and enabling a user to use a tool incorporating said ergonometric handle for a longer period of time with reduced fatigue. While the ergonometric handle provides these advantages, it is sufficiently close in shape to a conventional handle that extensive retraining of users familiar with conventional handles is not necessary. The ergonometric handle is designed to match the palm's natural concavity in its transverse axis; when viewed from above, the center part of the grip is thicker than at the ends. The ergonometric handle is further designed to accommodate the natural varying curvature of radius of the different digits; from the lateral side the profile is curved or humpbacked. The ergonometric handle is further designed so that its length closely matches the transverse length of the palm which creates a better balanced handle that more equally distributes stresses across the palm. The ergonometric handle is further designed with indentations for digit placement to enhance the hand's gripping position.

This design will allow the hand to function in its most natural or anatomic position. It will distribute grip forces over large areas of the hand and this will diminish stress concentration on delicate skin and underlying nerves and tendons and reduce the risk of pinching the skin between the ergonometric handle and the bones of the hand.

Practical applications of this ergonometric handle design will be useful in hand tools such as hammers, paintbrushes, paint rollers, cooking utensils, ice cream scoops, garden implements, and sports equipment among many other handle applications.

Prior attempts have been made to provide comfortable and less stressful grips. For example, U.S. Pat. No. 4,038,719, issued Aug. 2, 1977 ("Handle for Tools and Sporting Equipment") to Bennett explained the importance of maintaining alignment of body parts (specifically the wrist joint), to reduce localized joint stress and muscular effort. Numerous examples of simple bends in handles acknowledge this fact, but are less than sufficient for a variety of reasons. A simple angle of 19 degrees across the palm of the hand, as specified by Bennett, better fits the wrist, but does not accommodate the closing dynamics of the palm and digits. The orientation of this grip axis on the palm of the hand neither allows enough space for encroaching motions of the thumb base, nor brings the axis of the handle close enough to the relatively small grasping range of the ring of closure, formed by the smaller digits of the hand against the outer edge of the palm. Also, while a simple, angled handle may better align the wrist within one plane, it may not accommodate true alignment from other perspectives. Thus, the simple, uni-planer angle still allows a significant number of potentially stressful wrist postures.

While these patents correctly describe the benefits of an ergonometric handle, the solution they provide is incorrect. They do not address the critical differences of the posture of the individual digits in the natural gripping position. U.S. Pat. No. 4,183,528 ("Natural Physiological Grip for Game Rackets") issued Jan. 15, 1980 to An, suggests a two-part grip with a displacement of the grip axis, conforming to the space of a crease in the palm. Purportedly, this modification accommodates a functional split in hand gripping dynamics. The An grip conforms mainly to a grip posture, described by a pointing of the index digit and a grasping of remaining three digits. However, the transition area between the two-parts of the An grip present edges which can add discomforting localized friction.

The concept of power and precision have to be considered in the design of an ergonometric handle. When an element of precision is required in what is predominantly a power grip, such as during the use of a tool implement, the thumb becomes adducted so that by means of small adjustments of posture it can control the direction in which the force is being applied. The thumb becomes adducted and aligned in the long axis of the implement, with the result that the grip allows for both power and precision. The design of the invention accommodates these concepts of power and precision through accommodating the natural curvature of the digits and the indentations in the ergonometric handle for the placement of the digits. This tapering of the ergonometric handle and hand imprint allows a natural gripping position, maximizing the grip's power and precision.

Among the objects of the present invention are to provide a new and useful ergonometric handle apparatus which encourages a natural working grip, thereby increasing user comfort and enabling a user to use a tool incorporating such an ergonometric handle for an extended period of time.

Another object of the invention is to accomplish this result while maintaining a shape sufficiently similar to that of a conventional handle to take advantage of a user's experience with conventional handled tools thereby avoiding the need for extensive retraining.

These objects are achieved, in accordance with the invention, by providing an ergonometric handle which is characterized by a design which matches the palm's natural concavity in its longitudinal axis, accommodates the natural varying curvature of radius of the different digits, closely matches the transverse length of the palm, and incorporates indentations for digit placement. These design elements allow the hand to function in its most natural or anatomic position, distribute grip forces over a large area of the hand, and diminish stress concentration on delicate skin and underlying nerves and tendons.

Such an ergonometric handle accommodates the natural gripping position of the hand and the wrist, thereby increasing user comfort.

The various features of novelty which characterize the invention are pointed out with particularity in the claims annexed to and forming a part of this disclosure. For a better understanding of the invention, its advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which:

FIG. 5 is a side view of the novel ergonometric handle, designated a "right-side view" with reference to a right-handed user.

FIG. 6 is a front view of the novel ergonometric handle.

DESCRIPTION OF THE PREFERRED EMBODIMENT

The invention is an ergonometric handle shaped to encourage a natural working grip, thereby increasing user comfort and enabling a user to use a tool incorporating such an ergonometric handle for a longer period of time with reduced fatigue to the tissues, nerves, tendons, and bones of the hand.

The preferred embodiment will be described with reference to a right-handed user, although it will be obvious to those skilled in the art that it could also be modified for use by a left-handed (or ambidextrous) user.

Figure 1:
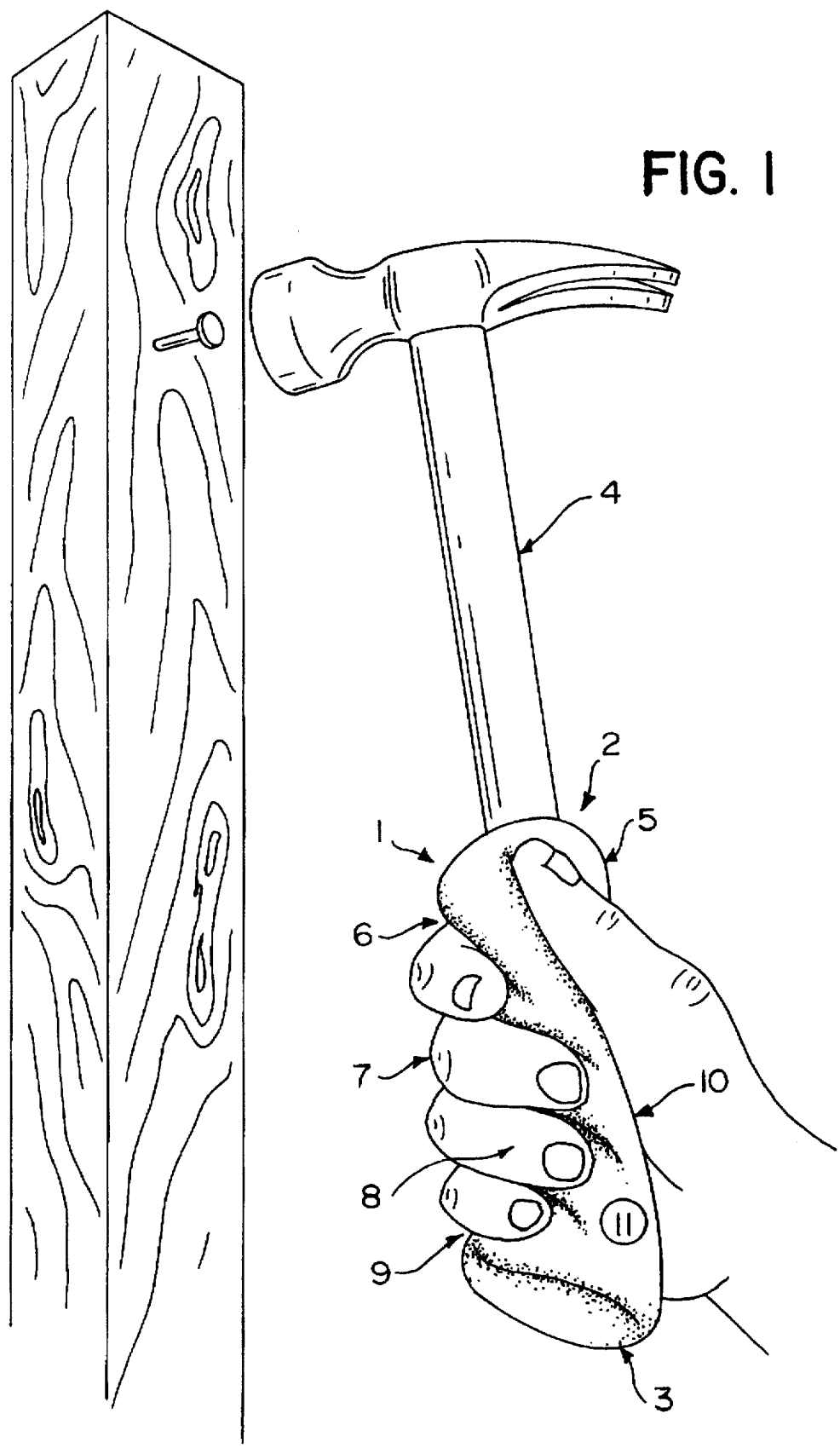
FIG. 1 is a perspective view of a user gripping a hammer with the novel ergonometric handle.

Referring to FIG. 1, the ergonometric handle (1) has a connecting end (2) and a free end (3), defining the extremes of a three-dimensional longitudinal surface (11) which surface encompasses the longitudinal axis of said ergonometric handle; the connecting end (2) is connected to a tool having a long axis or shaft (4) and is angularly disposed relative to said shaft (4).

Figure 2:
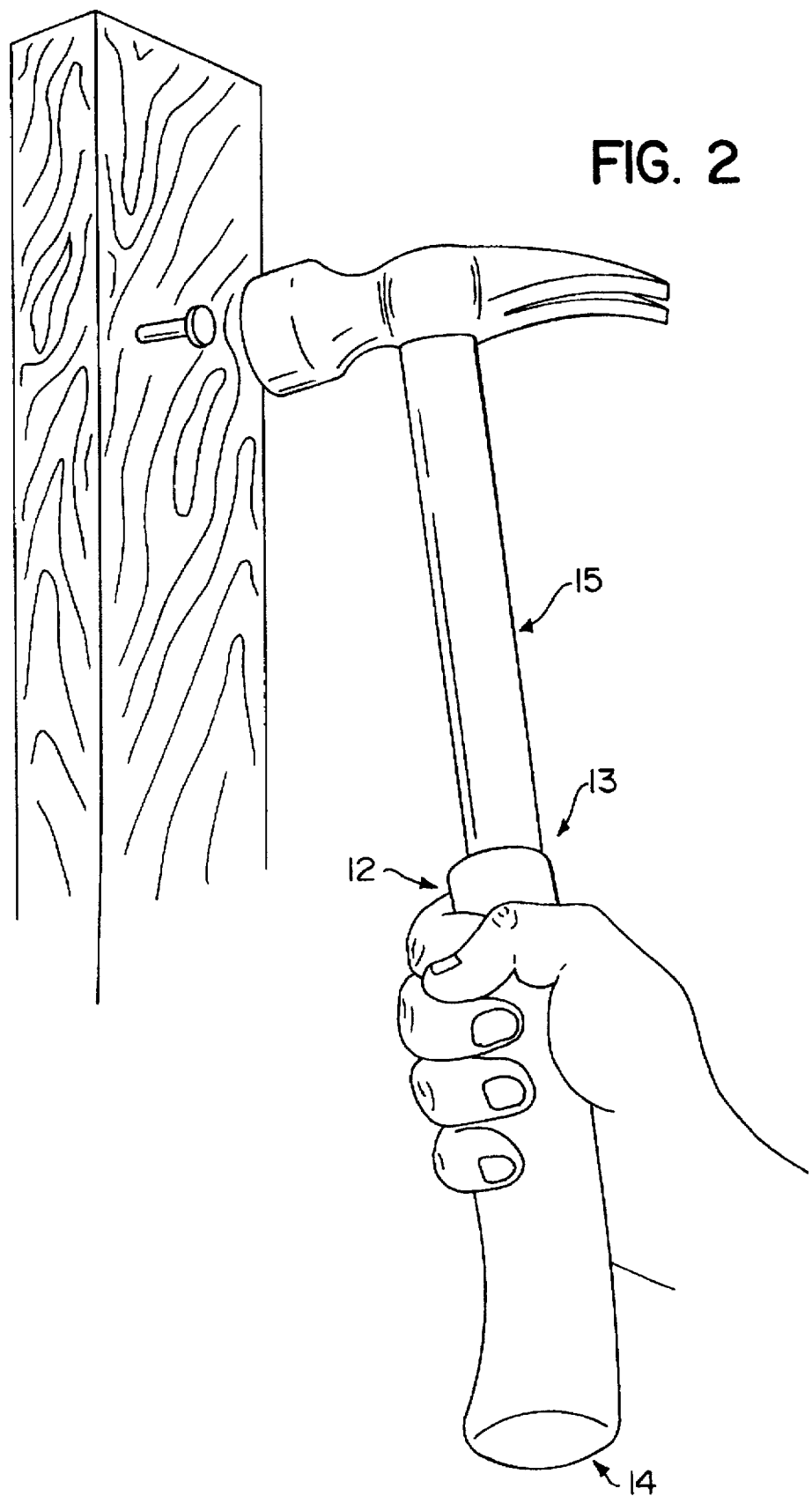
FIG. 2 is a perspective view of a user gripping a hammer with a conventional handle.

Referring to FIG. 2, a conventional handle (12) likewise has a connecting end (13) and a free end (14); its connecting end (13) is connected to a tool having a long axis or shaft (15).

Comparing FIG. 1 with FIG. 2, it can be seen that the ergonometric handle (1) provides within the longitudinal surface (11) a thumb indentation (5), an index digit indentation (6), a long digit indentation (7), a ring digit indentation (8), a small digit indentation (9) and a palm indentation (10), allowing the user's hand to approximate the anatomic position while gripping the ergonometric handle. The four aforesaid digit indentations (6–9) are collectively referred to as "the digit indentations" In contrast, as shown in FIG. 2, while gripping a conventional handle (12), a user's grip is strained and does not approximate the anatomic position. Note in particular the reduced contact between the user's thumb and the handle (12), and the misalignment of the user's forearm. An ergonometric handle made according to the invention encourages a natural working grip, while a conventional handle does not accommodate the closing dynamics of the user's palm and digits around the handle. In addition, a conventional handle allows a significant number of potentially stressful wrist postures.

The construction details of the ergonometric handle can best be seen in FIGS. 3 through 8 which provide views of the ergonometric handle from orthogonal angles.

Figure 3:
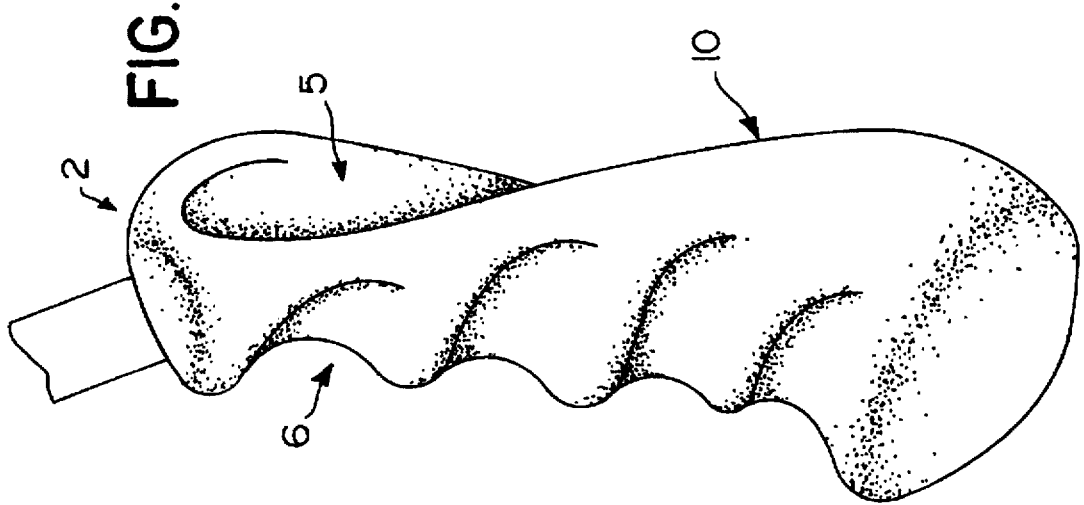
FIG. 3 is a side view of the novel ergonometric handle, designated a "left-side view" with reference to a right-handed user.

Referring to FIG. 3, it will be seen that the ergonometric handle (1) provides within its longitudinal surface (11) a thumb indentation (5). Preferably, it also includes an index digit indentation (6), a long digit indentation (7), a ring digit indentation (8), a small digit indentation (9) or a palm indentation (10), and most preferably it includes a thumb indentation (5), digit indentations (6–9) and a palm indentation (10). The longitudinal surface is shaped in such a fashion that the ergonometric handle tapers out to increased width when moving from ends (2) or (3), creating a cross-sectional shape which is essentially oblong and when viewed from the side is humpbacked. Such a shape may be created, for example, by gripping a soft material such as clay and in fact a customized ergonometric handle could be created in accordance with the invention by having the user grip a thermoplastic material so as to create a hand imprint as described, then setting the material so as to form an ergonometric handle.

The thumb and digit indentations preferably are at least long enough to accommodate the thumb or digit from the interphalangeal joint to the tip, and most preferably from the metacarpal phalangeal joint to the tip.

The digit indentations are angled with respect to a centerline drawn through the ergonometric handle longitudinally; preferably the angles are about 35 to 60 degrees for the digit indentations, increasing from the index digit to the small digit, and about 20 degrees for the thumb indentation.

Figure 4:
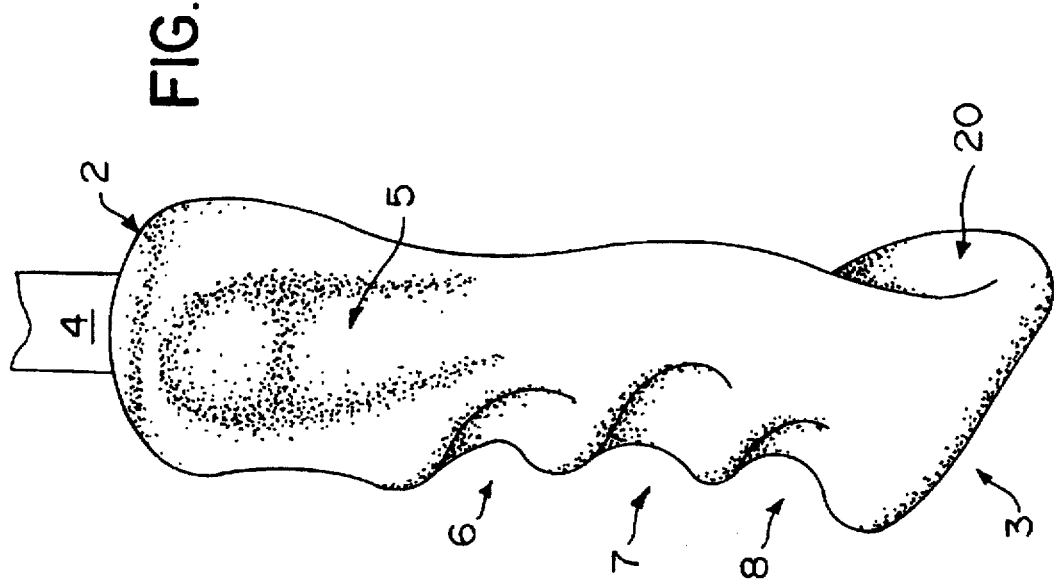
FIG. 4 is a back view of the novel ergonometric handle.

FIG. 4 illustrates the same indentations (5–8) when viewed from the back. The small digit indentation (9 in FIG. 3) is invisible in this view. An additional feature, not visible in FIG. 3, may be seen in this view. The open end (3) of the ergonometric handle (1) is flared so as to create a base rest (20) for comfortable contact with the user's hypothenar eminence.

The hand imprint shape is further illustrated in FIG. 5 (right side view) and FIG. 6 (front view), wherein like features are labelled as in FIG. 3. The thumb indentation (5 in FIG. 3) is invisible in the front view (FIG. 6).

Figure 7:
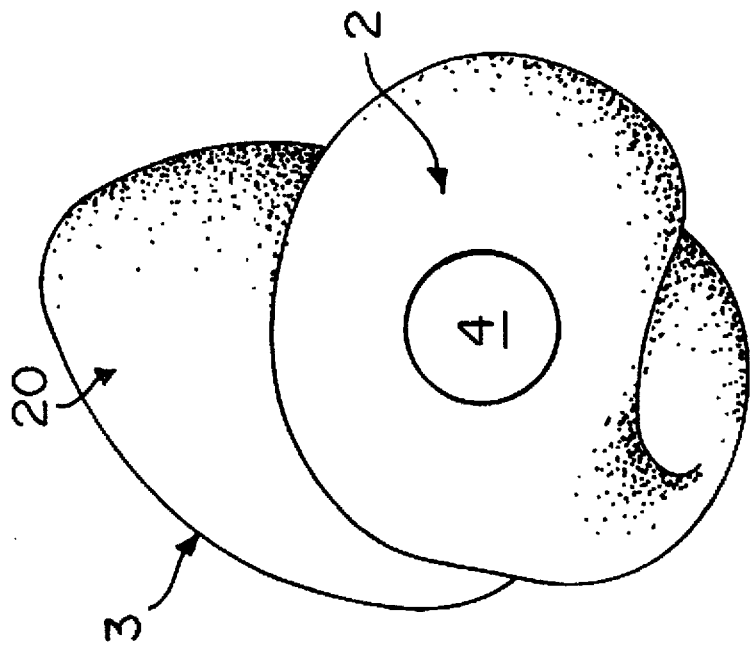
FIG. 7 is a top view of the novel ergonometric handle.

Referring to FIG. 7, the base rest (20) may be seen.

Figure 8:
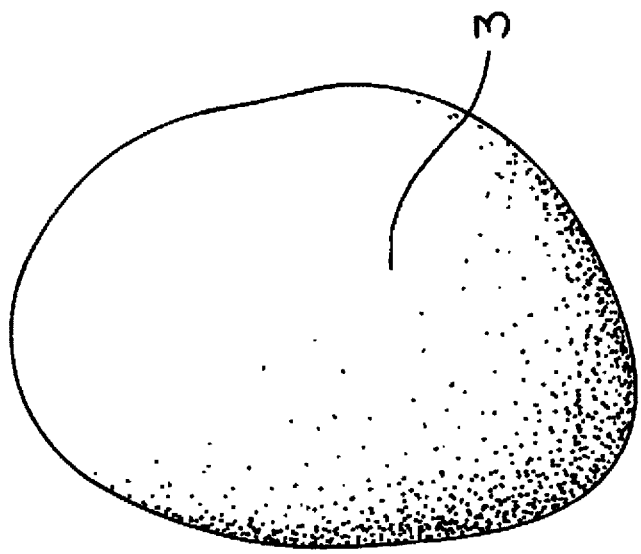
FIG. 8 is a bottom view of the novel ergonometric handle.

Thus configured, the ergonometric handle matches the natural concavity of a user's palm in its transverse axis and when viewed from the bottom as in FIG. 8, the ergonometric handle presents an oblong cross-section.

In order to accommodate the natural varying curvature of radius of the different digits, that is the smaller gripping circumferences of the index and the small digits, and the slope of the palm, the ergonometric handle is humpbacked, as can be seen along line (10) in FIG. 3. Preferably, the shaft (4) is disposed at an angle of about 200 from the longitudinal axis of the handle.

An ergonometric handle made according to the invention accounts for the closing dynamics of the palm and digits. The 200 angle relative to the shaft, and the humpbacked and oblong shape accommodate the curve of the user's palm, while the tapers accommodate the different slopes of the index and ring digit and the digital grips.

Figure 9:
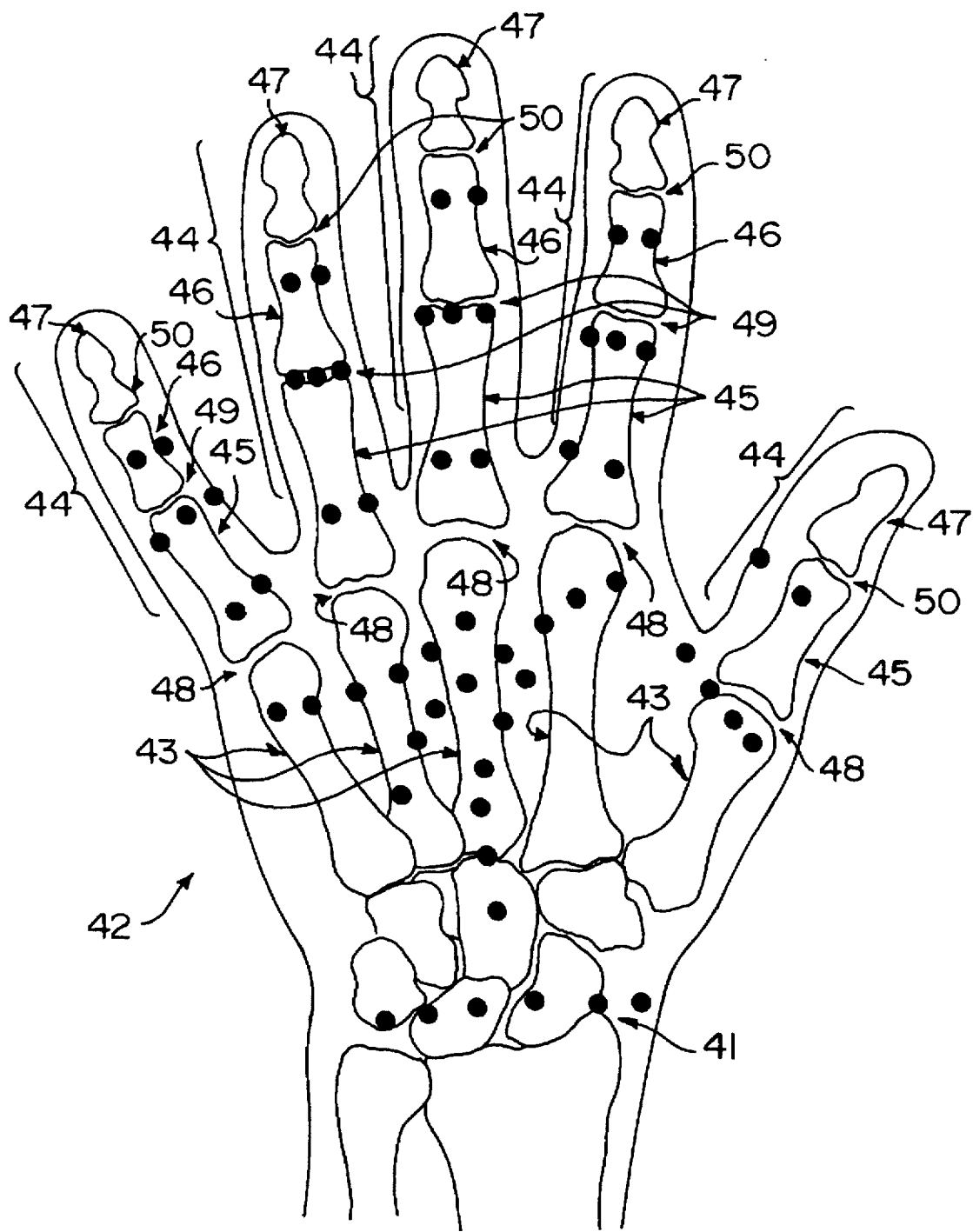
FIG. 9 illustrates the bone structure of the hand and wrist.

In describing the invention, it has been convenient to refer to certain anatomical terms. Those terms are illustrated in FIG. 9 which depicts the bone structure of the hand and wrist. FIG. 9 illustrates the wrist (41), hand (42), metacarpals (43), phalanges (44), proximal phalange (45), middle phalange (46), distal phalange (47), metacarpophalangeal joint (48), proximal interphalangeal joint (49) and distal interphalangeal joint (50).

Experimental Data

To illustrate the closing dynamics of the palm and digits around a conventional handle and an ergonometric handle made according to the invention, the following data was collected.

A prototype of the ergonometric handle of the present invention was produced, and a conventional handle was obtained.

The prototype was approximately 5 inches long and 1.5 inches wide at its widest point. Ergonometric handles of different sizes could, of course, have been selected, for example an ergonometric handle for a smaller adult hand might be 3 or 4 inches long and ½ inch wide at its widest point; for a larger adult hand, the dimensions would increase, while for a child's hand, the dimensions would decrease. Digit indentations were formed in the prototype at an angle of approximately 30 to 60 degrees from the longitudinal axis, a depth of approximately ¼ inch, and a length sufficient to accommodate a user's digits from the metacarpal phalangeal joint to the tip; a thumb indentation was formed in the prototype at an angle of approximately 20 degrees from the longitudinal axis, a depth of approximately ⅛ inch, and a length sufficient to accommodate a user's digits from the metacarpal phalangeal joint to the tip.

Each handle was covered with paint and then gripped with a typical male adult right hand. The hand was then pressed on a piece of paper and left an image, representing the hand's surface area in contact with the handle.

The surface areas of the total hand and gripping surface for each handle were determined using a planimeter, with the following results:

Total surface area of hand: 28.4 square inches

Gripped area (conventional handle): 11.85 square inches

Gripped area (ergonometric handle): 18.85 square inches

Thus, the ergonometric handle of the present invention increased the area of the user's hand in contact by more than 50%.

These results demonstrate that the invention allows the hand to use more of the hand's natural gripping surface area which enhances the anatomical gripping position of the hand.

As can be seen from the above description, it is possible to implement the invention simply and easily either by replacing a conventional handle on a hammer or any other tool or implement requiring a handle, and to use the tool or implement in the same manner as one with a conventional handle. The benefits of the invention accrue naturally, without any need for retraining a user.

Alternatively, the invention may be manufactured to accommodate both left and right hand grips. In this instance, the ergonometric handle would have digit indentions for both the left and right hands, thereby providing a dual ergonometric handle.

Alternatively, the invention may be manufactured from a thermoplastic material which would allow a user to create a personalized ergonometric handle. A user would use his or her own hand and grip the thermoplastic material when it is in a form-receptive-state, thereby creating an ergonometric handle which perfectly matches and maximizes his or her hand grip. Such an ergonometric handle would increase user comfort and control.

Thus, there has been described an ergonometric handle shaped so as to encourage a natural working grip, thereby increasing user comfort and enabling a user to use a tool incorporating said ergonometric handle for a longer period of time with reduced fatigue, and a manner of making and using the invention. The ergonometric handle is characterized by an angular disposition relative to the long axis of the implement, the beginning and the end of the ergonometric handle being smaller in width than the middle, and indentations in it creating a hand imprint to enhance the placement of the digits in the natural gripping position, and has a number of novel features involving the shape of the ergonometric handle in a configuration which reduces stress on the user without requiring extensive retraining of a user familiar with a conventional handle. The advantage of the invention is the resultant comfort of the user, without the cost of retaining.

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

I claim:

1. An ergonometric handle comprising a gripping surface shaped to encourage a natural working grip, having a connecting end and a free end defining the limits of a longitudinal surface, said surface encompassing a longitudinal axis of said ergonometric handle, and further comprising a thumb indentation within said surface of sufficient length to accommodate a user's thumb from the interphalangeal joint to the tip within said thumb indentation, wherein said thumb indentation is formed at an angle from the longitudinal axis of said ergonometric handle of approximately 20 degrees.

2. An ergonometric handle as in claim 1 wherein said ergonometric handle is humpbacked.

3. A tool comprising a shaft connected to an ergonometric handle as in claim 1 at an angle of approximately between 15 and 20 degrees.

4. An ergonometric handle comprising a gripping surface shaped to encourage a natural working grip, having a connecting end and a free end defining the limits of a longitudinal surface, said surface encompassing a longitudinal axis of said ergonometric handle, and further comprising a thumb indentation within said surface of sufficient length to accommodate a user's thumb from the interphalangeal joint to the tip within said thumb indentation, further comprising an indentation within said surface of sufficient length to accommodate a user's digit from the proximal interphalangeal joint to the tip, wherein said thumb indentation is formed at an angle from the longitudinal axis of said ergonometric handle of approximately 20 degrees, and wherein said digit indentation is formed at an angle from the longitudinal axis of said ergonometric handle of approximately 30 to 60 degrees.

5. A tool comprising a shaft connected to an ergonometric handle as in claim 4 at an angle of approximately between 15 and 20 degrees.

6. A tool as in claim 5 wherein said tool is a hammer.

7. A tool as in claim 5 wherein said tool is a paintbrush.

8. A tool as in claim 5 wherein said tool is a paint roller.

9. A tool as in claim 5 wherein said tool is a garden implement.

10. A tool as in claim 5 wherein said tool is a fishing rod.

11. A tool as in claim 5 wherein said tool is a golf club.

12. A tool as in claim 5 wherein said tool is a ski pole.

13. A tool as in claim 5 wherein said tool is a tennis racket.

14. A tool as in claim 5 wherein the ergonometric handle is at least 3 inches long and at least ½ inch wide at its widest point.

15. An ergonometric handle as in claim 4 wherein said ergonometric handle is humpbacked.

16. A tool comprising a shaft connected to an ergonometric handle as in claim 4 at an angle of approximately between 15 and 20 degrees.

* * * * *